United States Patent [19]

Stucke et al.

[11] Patent Number: 4,484,877
[45] Date of Patent: Nov. 27, 1984

[54] TWIN-NOZZLE EXTRUSION HEAD

[75] Inventors: Walter Stucke, Ratingen; Karl-Heinz Glissmann, Essen, both of Fed. Rep. of Germany

[73] Assignee: Mannesmann AG, Duesseldorf, Fed. Rep. of Germany

[21] Appl. No.: 444,388

[22] Filed: Nov. 26, 1982

[30] Foreign Application Priority Data

Nov. 27, 1981 [DE] Fed. Rep. of Germany ....... 3147709

[51] Int. Cl.³ ............................................. B29D 23/04
[52] U.S. Cl. .................................... 425/113; 156/500; 264/173; 264/174; 425/133.1; 425/376 A; 425/462; 425/467
[58] Field of Search ................ 264/174, 173; 425/113, 425/114, 381, 466, 376 A, 462, 133.1, 467; 156/244.13, 244.14, 500

[56] References Cited

U.S. PATENT DOCUMENTS

| | | | |
|---|---|---|---|
| 2,978,748 | 4/1961 | McCauley et al. | 425/467 |
| 2,987,766 | 6/1961 | Porter | 425/462 |
| 3,605,190 | 9/1971 | Christy | 425/113 |
| 3,899,276 | 8/1975 | Sokolow | 425/467 |
| 3,957,942 | 5/1976 | Meudec | 264/173 |
| 4,042,661 | 8/1977 | Cook | 425/133.1 |
| 4,280,801 | 7/1981 | Wheeler et al. | 264/173 |

FOREIGN PATENT DOCUMENTS

| | | |
|---|---|---|
| 1957078 | 5/1971 | Fed. Rep. of Germany . |
| 2332518 | 1/1975 | Fed. Rep. of Germany ... 425/133.1 |
| 2557718 | 7/1976 | Fed. Rep. of Germany ... 425/133.1 |
| 892302 | 3/1962 | United Kingdom ................ 425/113 |

Primary Examiner—Jeffery Thurlow
Attorney, Agent, or Firm—Ralf H. Siegemund

[57] ABSTRACT

The twin-nozzle extrusion head in accordance with the invention includes basically three axially spaced but radially overlapping annular housing members, together establishing two nozzle gaps and a first and a middle one of the two members are provided with annular feeder ducts for these nozzles. Each of these ducts has on its exit side a baffle ring wherein one baffle ring is effective on its radially inner surface while the second baffle ring is effective on a radially outer surface of larger diameter. These surfaces are nonround in a particular determined manner to establish nonuniform gap width related directly to the location of feed ducts for the annular channels, generally, the gaps are wider in locations away from a proximity of such feed ducts. The nozzle gaps are both frustoconical of different steepness and terminate in a common plane. The nozzles are particularly provided for disposing an adhesive on top of a steel pipe and a polyethylene coating and envelope on top of the adhesive.

8 Claims, 7 Drawing Figures

TWIN-NOZZLE EXTRUSION HEAD

BACKGROUND OF THE INVENTION

The present invention relates to a head for the extrusion of two thermoplastic layers to be deposited for example upon a steel pipe. Heads of the type to which the invention pertains are used for example to deposit a coating of a thermoplastic adhesive such as an ethylene copolymer upon a steel pipe and simultaneously a jacket of a thermoplastic material such as polyethylene is extruded on top of the thermoplastic adhesive.

The German printed patent application No. 1957078 discloses an extrusion head which includes a first annular housing member, an intermediate ring and a second annular housing member whereby the first housing member together with the intermediate member establishes an annular opening and nozzle for the depositing of the first inner layer such as the adhesive, and the intermediate ring together with the second annular housing member establishes a second gap and a second nozzle opening for depositing the outer synthetic envelope. The first housing annulus, the intermediate ring and the second housing annulus are arranged essentially in axial direction one behind the other, but the nozzle openings i.e. the ends of the two annular gaps terminate in a common plane.

This particular printed patent application provides annular ducts for feeding the adhesive and the thermoplastic material whereby baffle rings are disposed in these annular channels. The feeder duct and annular channel for the adhesive is particularly arranged in the first mentioned housing annulus; the intermediate ring includes a heating structure and the second annular housing member includes the feeder duct and annular channel for feeding the thermoplastic material which becomes the outer envelope. The two annular feeding ducts and the baffle ring respectively arranged therein are disposed one behind the other but in the same plane and they have similar diameters. The baffle rings are adjustably disposed using steel screws which are disposed outside the extruder head to shift the baffle rings in relation to their longitudinal axis, i.e. excentrically, in order to obtain a desired adjusting position. These baffle rings and particularly their inner circumferential surfaces extend into the annular ducts and are of an elliptical configuration. The purpose thereof is that the adhesive as well as the synthetic for the outer coating can be distributed in a uniform layer thickness with reference to the circumference of the steel pipe but under consideration of the differences in viscosity.

Experience has shown that in some cases an adjustment of the baffle rings during operation has to be carried out against a relatively high working pressure of the adhesive and of the liquidous plastic, the pressure being for example 100 to 300 bars at an operating temperature from 150 to 170 degrees Centigrade. It is a distinct disadvantage that the adjustment has to be carried out here with a very high force. The requisite force has frequently resulted in a permanent deformation of the baffle rings and that of course leads to an uneven layering and coating thickness. Moreover, the baffle rings had to be exchanged, in fact quite frequently.

In accordance with a different aspect it has been found that the annular ducts as described in the above mentioned German patent application exhibit orientations of the gaps for the adhesive and the outer coating material which are angled off, the annular feed ducts run to some extent perpendicularly toward the steel pipe to be jacketed. Consequently, the travel path for the material is relatively long, particularly through the extruder head and toward the common exit and nozzle opening resulting in an increase in counterpressure at rather high operating temperature. Since the adhesive is often sensitive to high temperatures, it is conceivable that the material decomposes to some extent resulting in a deterioration of the adhesiveness particularly which affects directly the bonding of the jacket which is to be made to adhere to the steel pipe by that adhesive. Any deterioration in the adhesion may result in corrosion inside the extrusion head because the decomposing produces a certain amount of acid.

DESCRIPTION OF THE INVENTION

It is an object of the present invention to avoid any deficiencies and drawbacks outlined above and to provide a compact construction for an extrusion head in which the extrudate is forced to move along short paths so that it is actually possible to use as one of the extrudates an adhesive which is predried ethylene copolymer resulting in improved adhesiveness of the synthetic coating to be deposited on top of the adhesive layer, the latter being deposited upon a steel pipe or the like.

In accordance with the preferred embodiment of the present invention it is suggested to provide a twin nozzle extrusion head for depositing two layers in superimposed relationship upon a pipe, the extrusion head to be comprised of a first, a second and a third annular housing member; the first and the second housing members having annular channels and duct means for feeding the respective channels. A straight frusto-conically shaped extruder nozzle duct is provided between the first and the second annular housing member for depositing an inner layer upon a steel pipe, a second nozzle duct is established between the second and the third annular housing member. The flow out of the two annular channel induct means is throttled by means of two baffle members or rings wherein the radially inwardly directed throttling surface in one of the baffle rings is effective in the channel means of the first housing member and a radially outwardly directed throttling surface of larger diameter of the second baffle ring is effective in the annular channel of the second annular housing member. Both of these baffle rings are removable but not adjustable, i.e., they are placed in fixed positions in the extruder head. The respective throttling surfaces are to follow particular geometric rules which will be explained more fully below. Generally speaking, they establish gaps out of the respective annular channel means of relatively narrow dimensions adjacent to feed points for these annular channels while being relatively wide in between. The particular non-round cylindrical throttling surfaces of the baffling members are preferably composed of segments having particular radii and the desired geometric configuration is obtained through choosing particular radii as well as particular centers or points of origin.

The particular nozzle head in accordance with the preferred embodiment of the invention meets the objectives and overcomes the drawbacks and deficiencies outlined above. One of the important features is to be seen in that the outer jacket material is fed to the intermediate one of the three annular housing members. The difference in diameters for the annular channels and for the effective throttling surfaces of the baffle rings moreover, permit elimination of heating catridges in this interior ring. This feature permits a more compact, i.e., shorter construction for the extruder head. Also, the annular channel for the adhesive being the inner one of the two layers to be extruded is placed radially closer to the common center and axis of the system and that in turn permits a shorter path for the material. A straight frusto-conical nozzle gap configuration is in fact the shortest possible path which is realizable within the concept of the invention. This particular configuration moreover is very amenable to avoiding a high counter-pressure within the duct and nozzle system. It can also be seen that the overall construction of the extrusion head permits a shorter dwell time of the adhesive inside the extruder head and this in turn, of course, reduces the tendency for the material to decompose and accordingly corrosion is avoided. Since the baffle rings are no longer under pressure of adjusting screws, there will be no permanent deformation. The desired homogeneity and uniformity in the layer thickness is obtained strictly by the geometry and that permits working without adjustability.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

Figure 1:
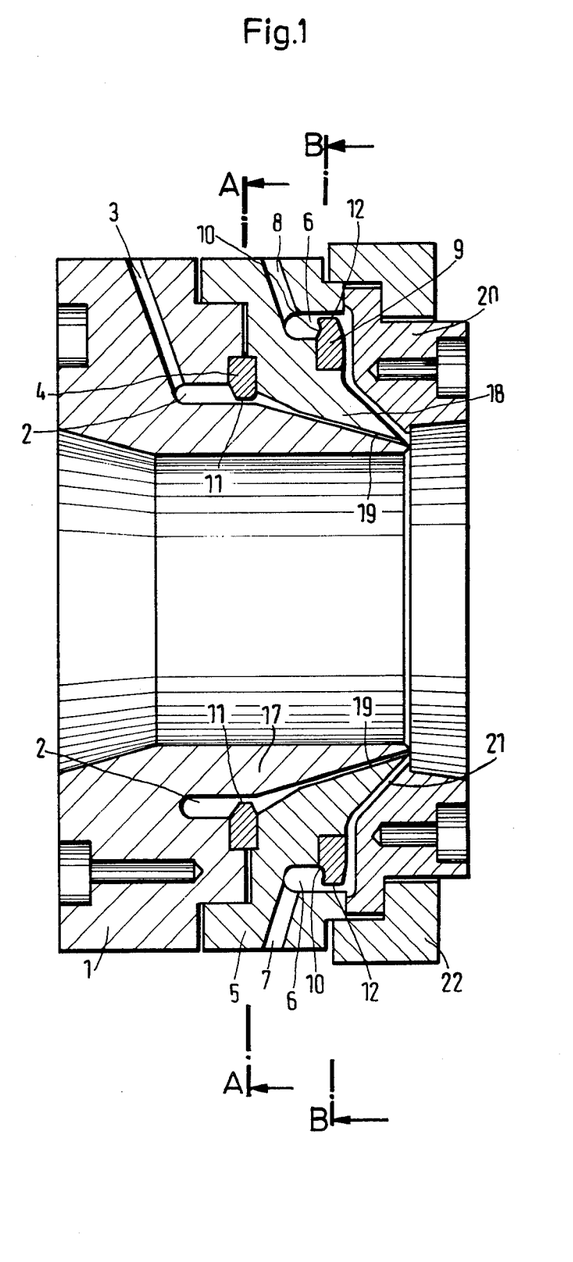
FIG. 1 is a longitudinal section view through the extrusion head constructed in accordance with the preferred embodiment of the present invention for practicing the best mode thereof.

Proceeding now to the detailed description of the drawings, the extrusion head illustrated includes three basically annular members being hosing members because together they constitute the head proper. These annular members are identified by reference numerals 1, 5 and 20, respectively. The annular housing member 1 includes an annular duct or channel 2 which is provided for feeding the extruded adhesive into a frusto-conical nozzle duct 19 established between the members 1 and 5. Extrudite is fed into the annular channel 2 by means of a duct 3. In other words, the material entering the head through the feeder duct 3 is annularly distributed by means of the annular duct 2 and distribution channel for further passage into the nozzle duct 19. That nozzle duct slants straight towards the pipe at a rather shallow angle, i.e., the apex angle of the cone is small.

A baffle ring 4 extends into the duct 2; the ring 4 is positively positioned but is exchangeable. The ring 4 is particularly received in annular recesses provided in housing part 1 and housing part 5. The baffle ring 4 leaves a throttling gap 11 for the flow of material from the channel 2 into the nozzle 19.

The annular housing member 5 is further provided with an annular duct and channel 6 in which end feeder bores 7 and 8 which are diametrically opposed and are provided for example for being connected to separate extruder barrels for receiving the material which will become the outer coating or envelope on the steel pipe and that material is distributed annularly by and within the annular channel and duct 6. A baffle ring 9 extends into this annular duct 6 leaving but a narrow gap 12. Material can flow through that gap into a frusto-conical nozzle 21 being steeper than nozzle 19. The baffle ring 9 is provided with an indent 10 at the side facing the ends of the feeder ducts 7 and 8. This indent 10 facilitates the uniform distribution of the viscous synthetic within the annular distribution channel or duct 6.

Figure 4:
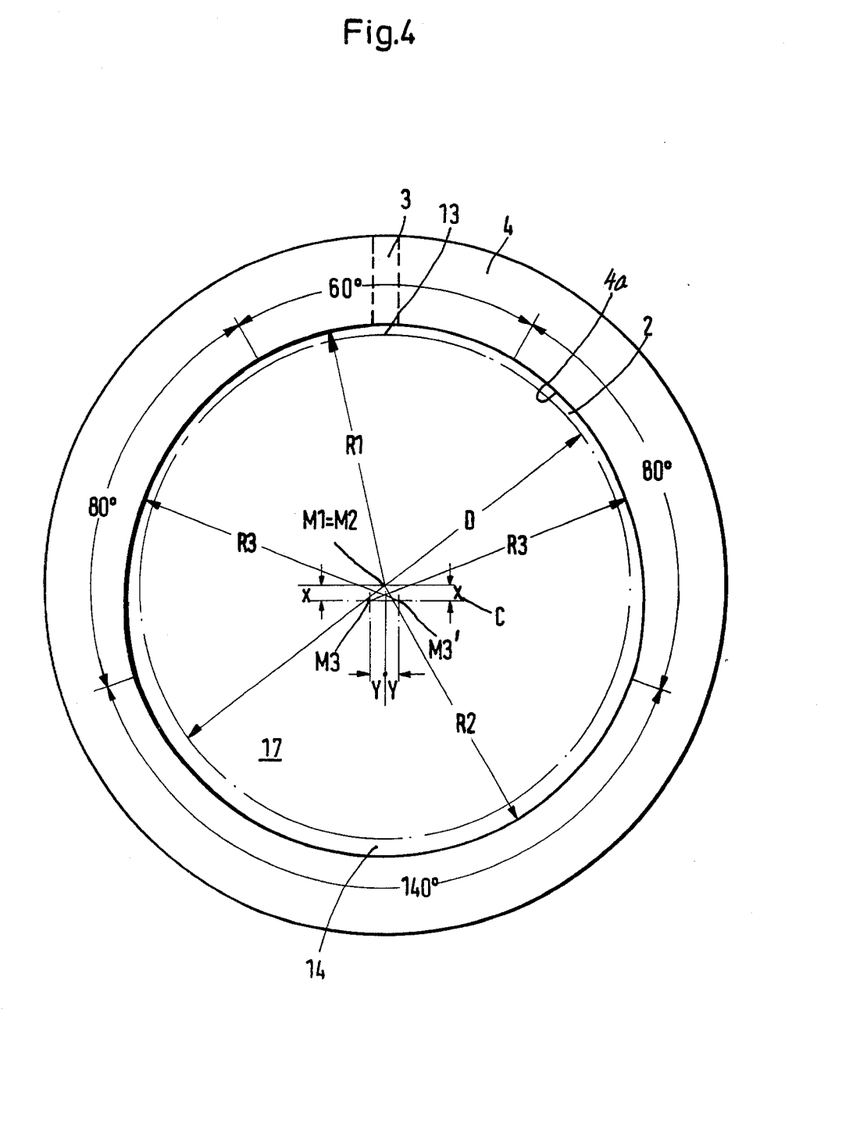
FIG. 4 is a plan view of a baffle ring used in the extrusion head shown in FIGS. 1, 2 and 3, and here particularly in the annular channel or duct for the adhesive.
Figure 5:
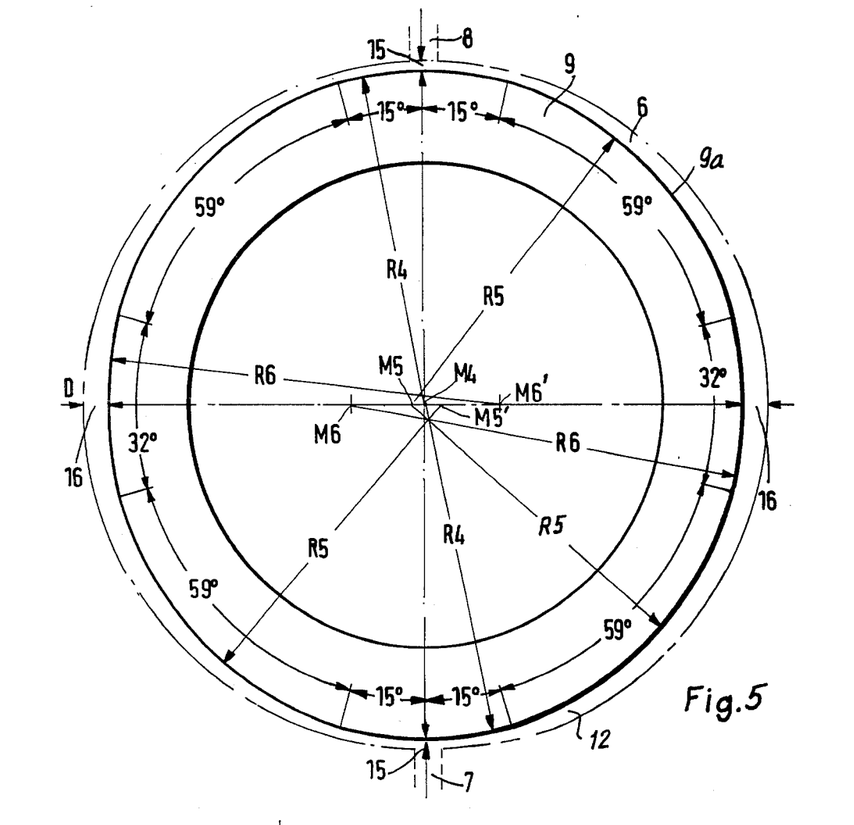
FIG. 5 is an analogous view of the baffle ring used in the annular feeder channel for the outer coating.

As can be seen from FIG. 4, the inner surface 4a of the baffle ring 4 is not exactly circular but deviates from a circle in a manner to be described shortly. This deviation is deemed necessary for obtaining a uniform thickness of the adhesive coating which is to be extruded upon the steel pipe. Analogously, as shown in FIG. 5, the outer periphery 9' of the ring 9 deviates from a circular cylinder for the same purpose. Turning now particularly to FIG. 4, one can see that the deviation of the surface 4a from a circular cylinder is constituted by three unequal radii R1, R2 and R3, but the two radii R1 and R2 both originate from a common center or, better, from the center axis M1 of the annulus 4. The diameter D delineates a circle which represents the opposing cylindrical surface of duct 2.

Figure 2:
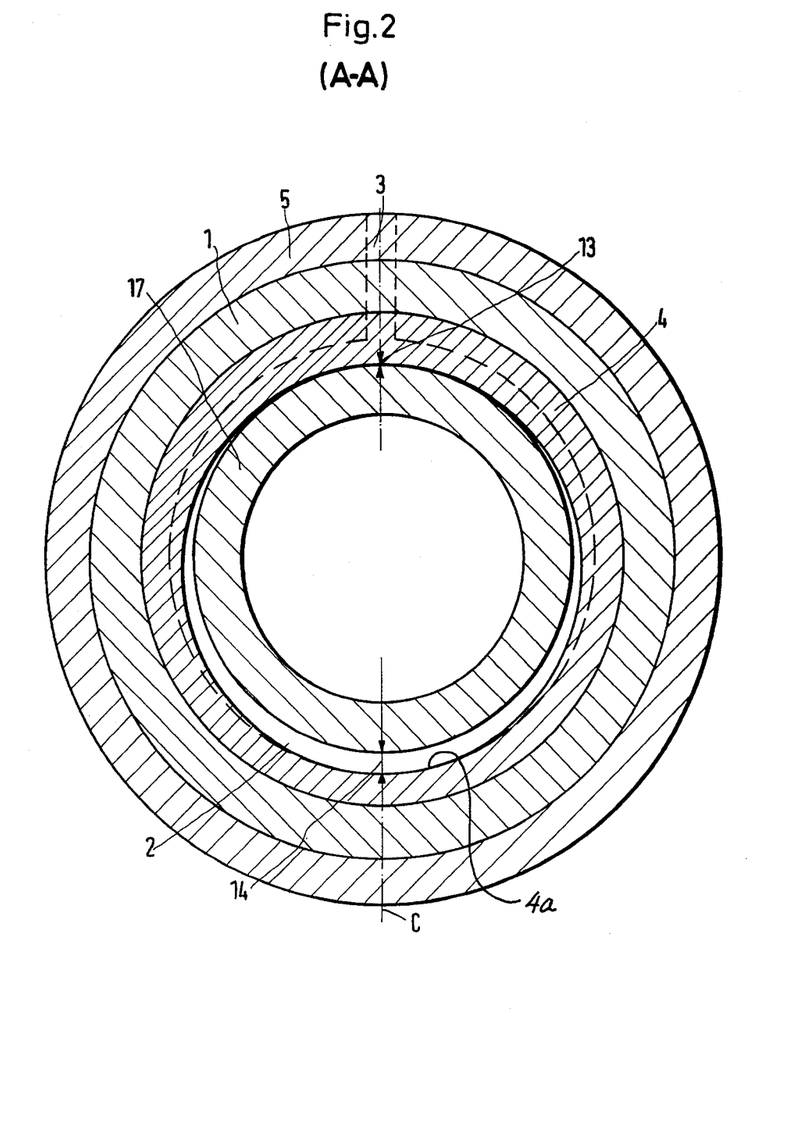
FIG. 2 is a cross section through the extrusion head shown in FIG. 1, the section plane being taken as indicated by A-A in FIG. 1.

The radius R1 covers an angle of 60 degrees and includes the end of the feeder duct 3. The radius R2 covers a range of 140 degrees being located opposite to the range covered by the radius R1. The radius R3 is used twice, i.e., for two different angular ranges separating the two aforementioned ranges, each of them being 80 degrees. The radius R3 is larger than the radii R1 and R2 and is used from two different centers, M3 and M3'. These two centers, M3 and M3', are located on a line C and they are spaced from each other by a distance Y on that line. The line C itself is spaced from the point M1 by the distance X. As a consequence of this arrangement the width of the annular duct 2 is smaller at the location 13, opposite the end of the adhesive feeder duct 3, than in an opposite location such as 14, and the widening in radial direction of that duct is a continuous one from the region 13 to the region 14. The geometry is depicted here in FIG. 4 while the duct width of the duct 2 can be seen from this figure as well as from FIG. 2.

Figure 5A:
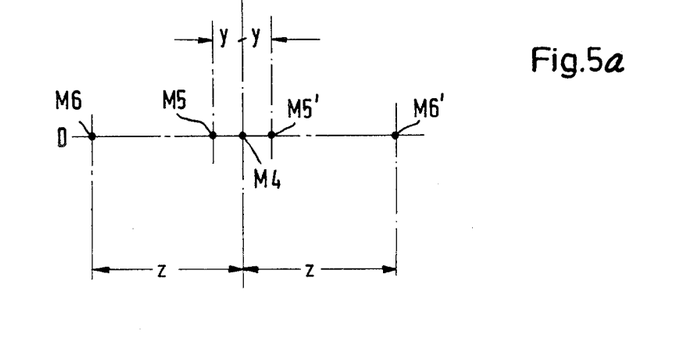
FIG. 5a is a geometric diagram relative to the FIG. 5.
Figure 6:
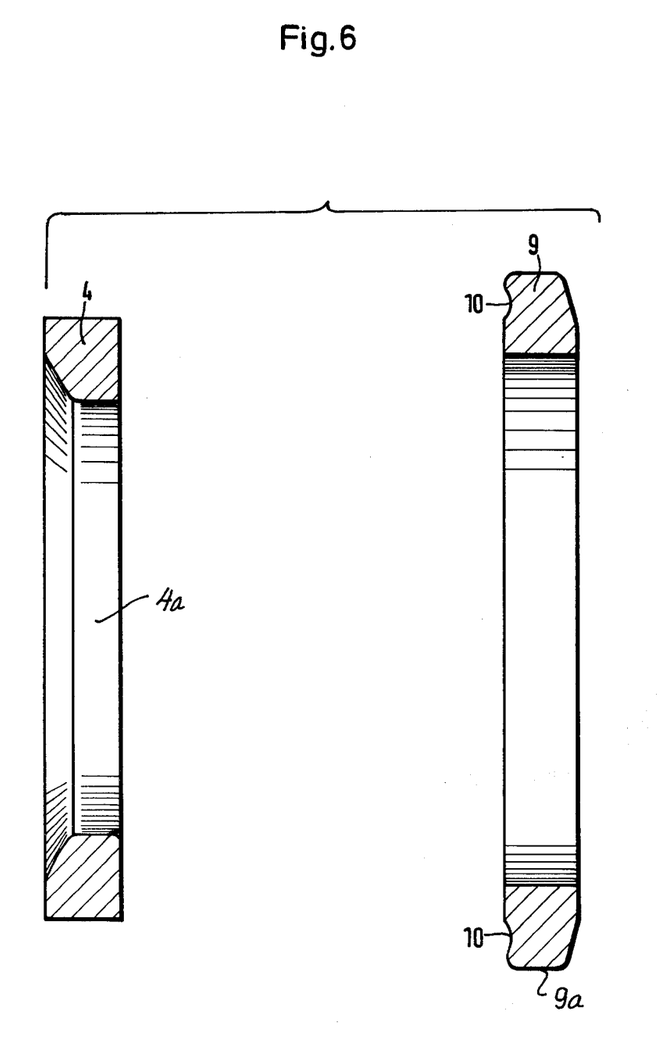
FIG. 6 illustrates the two baffle rings shown in FIGS. 4 and 5, but in a geometric disposition in relation to each other resembling their position inside the extrusion head shown in FIGS. 1, 2 and 3.

The deviation from a circular cylinder of the outer surface 9' of ring 9 is shown in FIG. 5. The determining geometric parameters here are the three radii, R4, R5 and R6. Each of these radii originates from a different center, therebeing centers M4, M5, M5', M6 and M6'. These five centers are located on a common line D which runs though the center or center axis of the particular baffle ring, that center coinciding with the center M4 of the radius R4. The centers M5 and M5' are symmetrically spaced from the center M4 by the same distances Y and the two centers M6 and M6' are symmetrically spaced from the center M4 by the same distance Z (see FIG. 5a for details). The radius R4 is used twice and covers in each instance a range of 30 degrees respectively centered around the center of the feeder ducts 7 and 8. Therefore this radius determines the geometry of the outer periphery 9a of the ring 9 in two locations respectively adjacent the ducts 7 and 8.

Figure 3:
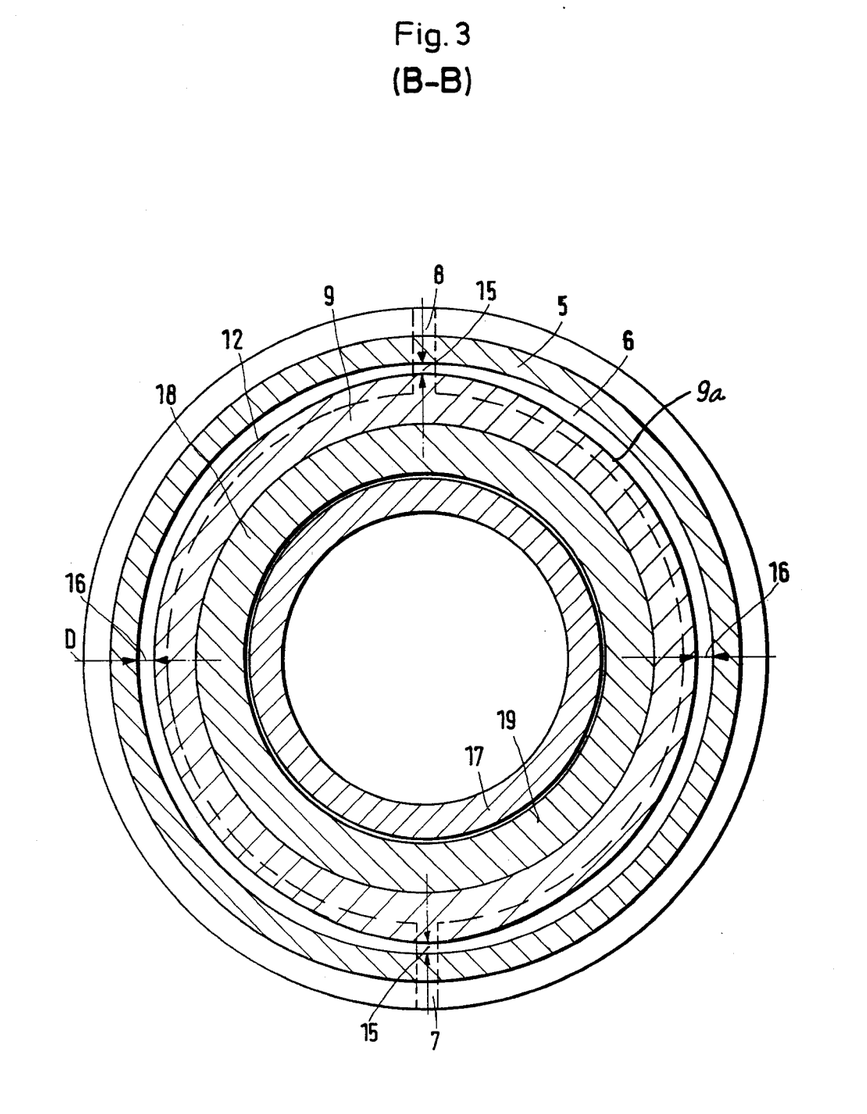
FIG. 3 is a similar cross section taken in the plane defined by B-B in FIG. 1.

The radius R5 is used four times and covers in each instance an adjacent range which extends for about 59 degrees. The respective center or point of origin being the point M5 in two cases and M5' in the other two cases. Two other portions of the periphery of annulus 9 are determined by the radius R6. The point of origin in each instance being M6 and M6' and each of the two ranges covers an angle of 32 degrees. As a consequence of this arrangement, the gap 12 between the surface 9a and the respective oppositely located strictly cylindrical boundary of the annular channel 6 establishes a contour which is narrower in the locations 15 adjacent the feeder ducts 7 and 8 than on adjacent the locations 16 being 90 degrees offset from the locations 15. The details here are readily derivable from FIGS. 3 and 5, particularly, the geometry of the gap 12 can be taken from those figures.

Reference numeral 17 refers to an axial extension of annulus 1 and is of mandril-like configuration for establishing primarily the passageway for the steel pipe. Moreover, this part 17 together with a somewhat similar part 18 of the ring 5 establishes the gap 19 ending in a nozzle and through which the adhesive extrudite is deposited upon the pipe passing through. The part 18, in addition, establishes the second duct and nozzle 21, together with the appropriate ring and annulus 20. The nozzle gap 21 is of course the continuation of the annular duct 6. The two nozzles 19 and 21 terminate and operate in the same radial plane so that the jacketing procedure is carried out with strict concurrence of the application of the adhesive on one hand and of the envelope to be bonded and pasted to the steel pipe on the other hand. Reference numeral 22 refers to a completing flange of annular configuration; the drawings do not show the usual bolts and threaded bores by means of which the parts 1, 5, 20 and 22 are bolted together to establish the extrusion head. Reference numeral 25 refers to heating catridges in the two housing annuli 1 and 20, there being no such cartridges in the middle member 5.

The various figures and here particularly FIGS. 2 through 5 illustrate specific angular ranges concerning the non-round geometry of certain relevant surfaces of the two baffle rings. These angles constitute the best mode of practicing the invention with regard to the depositing of an adhesive consisting of polyethylene acrylic acid ester and of an outer envelope being comprised of polyethylene. In particular, and by implication more generally, the inner layer so deposited namely, the adhesive has a viscosity of i2.6 being equal to 7 to 8 and the polyethylene has a viscosity of i2.16 being equal to about 0.3 to 0.4. The thickness of the adhesive coating applied to a steel pipe is between 0.2 and 0.3 millimeters and the thickness of the polyethylene envelope deposite thereupon is about 1.6 to 2.2 millimeters. If the material such as the adhesive and the synthetic coating are of different material and/or have different viscosities, one has to use different geometries for the baffle rings in the extruder head whereby particularly the radii of specific curvatures and the angular ranges for these curvatures differ and are to be matched to these different viscosities. Accordingly, these different geometries result in different gaps and different distributions of gap parameters around the nozzle and extrusion peripheries. On the basis of a particularly desired thickness of the plastic coating to be provided on a steel pipe of a particular diameter, one can ascertain the optimum gap and nozzle width particularly under consideration of the desired throughput and speed of extrusion. The results can be ascertained on a trial and error basis, but also by way of calculation. It should be said however, that the general rule is that the radii and the distance between their centers have to be the largest, the more viscous the materials, i.e. the adhesive and the jacketing synthetic actually are under the local conditions.

The invention is not limited to the embodiments described above; but all changes and modifications thereof, not constituting departures from the spirit and scope of the invention, are intended to be included.

We claim:

1. Twin nozzle extrusion head for depositing two layers in superimposed relationship upon a pipe comprising:
    a first annular housing member having a first annular channel and duct means for feeding the channel;
    a second annular housing member being disposed generally and in axially displaced relationship to the first member;
    a first removable but unadjustable baffle member interposed between the first and second members and having a radially, inwardly directed, non-round, throttling surface, deviating from a circular contour, for providing a narrow annular exit gap from the annular channels;
    the non-round baffle surface facing a round exit gap to provide therewith a gap varying in width in azimuthal direction, with a smaller gap width adjacent the duct means;
    the first and the second members defining a straight frusto-conically shaped extruder nozzle duct extending from said exit gap in slanting relation towards a nozzle exit;
    the second member having a second annular channel and duct means, the channel being of larger diameter than the first channel means;
    a third annular housing member disposed in axially spaced relation to the second member, the second and third members together defining a second extrusion nozzle terminating close to said first nozzle duct; and
    a second removable but unadjustable baffle ring interposed between the second and the third members and having a radially outwardly directed, non-round throttling surface of larger diameter than the throttling surface of the first baffle ring, for providing a narrow gap betwen the second annular duct and the second nozzle gap;
    the second nozzle gap having a round surface facing the non-round surface of the second ring to provide therewith a gap varying in width in azimuthal direction, with smaller dimensions adjacent the duct means in the second member.

2. An extrusion head as in claim 1, said respective non-round throttling surface being geometrically established by segments of cylinder surfaces of different radii.

3. An extrusion head as in claim 2 wherein the feeder duct means provided for feeding the annular channels are provided adjacent to a respective location in which the said gaps are narrow.

4. A nozzle head as in claim 1, the second baffle ring having an annular indent facing the second channel, there being at least one feeder duct means for the second channel having an exit facing the indent.

5. A nozzle head as in claim 2, the first ring having an inner surface whose geometry is determined by three different radii, the two smaller ones determining the curvature of the surface in two opposite locations and having a common center, the largest radius determining the curvature in between and originating from two centers offset from each other and from said common center.

6. Extrusion head as in claim 2, the second ring having an outer surface whose geometry is determined by three radii, a first small one of the radii determining the curvature of the surface in two opposite locations and having a common center coinciding with the center of the second rings; a second large one determining the curvature of the surface in that location, being generally offset by 90 degrees from the said opposite locations, and a third, largest one of the three radii each determining curvatures respectively in between said locations, the radii all originating in centers being situated on a common line through said common center.

7. Extension head as in claim 2 wherein a single duct feeds one of the annular channels, the respective non-round throttle surface being composed of four cylinder segments of different radii.

8. Extension head as in claim 1 wherein the non-round surface is composed of cylindrical sections of different radii, a section thereof being a duct having a relatively small radius, a section farther therefrom having a large radius, a transition section between them having largest radius.

* * * * *